(12) United States Patent
Morris et al.

(10) Patent No.: US 8,727,283 B2
(45) Date of Patent: May 20, 2014

(54) LAUNCH ABORT AND ORBITAL MANEUVER SYSTEM

(75) Inventors: Dennis E. Morris, Newbury Park, CA (US); Alfred Little, Simi Valley, CA (US)

(73) Assignee: Aerojet Rocketdyne of DE, Inc., Sacramento, CA (US)

( * ) Notice: Subject to any disclaimer, the term of this patent is extended or adjusted under 35 U.S.C. 154(b) by 468 days.

(21) Appl. No.: 13/154,873

(22) Filed: Jun. 7, 2011

(65) Prior Publication Data
US 2012/0312927 A1    Dec. 13, 2012

(51) Int. Cl.
*B64G 1/40*    (2006.01)

(52) U.S. Cl.
USPC ..................................... 244/171.1

(58) Field of Classification Search
USPC ..................... 244/158.1, 171.1, 171.3, 172.1
See application file for complete search history.

(56) References Cited

U.S. PATENT DOCUMENTS

| | | | |
|---|---|---|---|
| 3,001,739 A * | 9/1961 | Faget et al. | 244/172.1 |
| 3,232,560 A | 2/1966 | Moise et al. | |
| 3,289,974 A | 12/1966 | Cohen et al. | |
| 3,606,212 A * | 9/1971 | Paine | 244/172.1 |
| 3,929,306 A | 12/1975 | Faget et al. | |
| 3,955,784 A | 5/1976 | Salkeld | |
| 3,999,728 A | 12/1976 | Zimmer | |
| 4,796,839 A | 1/1989 | Davis | |
| 4,802,333 A | 2/1989 | Smith | |
| 4,802,639 A | 2/1989 | Hardy et al. | |
| 4,860,971 A | 8/1989 | Allen | |
| 4,887,780 A | 12/1989 | Goodrich et al. | |
| 5,058,830 A | 10/1991 | Wurst et al. | |
| 5,117,758 A | 6/1992 | Renzi | |
| 5,129,602 A | 7/1992 | Leonard | |
| 5,141,181 A | 8/1992 | Leonard | |
| 5,143,327 A | 9/1992 | Martin | |
| 5,143,328 A | 9/1992 | Leonard | |
| 5,203,844 A | 4/1993 | Leonard | |
| 5,217,187 A | 6/1993 | Criswell | |
| 5,417,049 A | 5/1995 | Sackheim et al. | |
| 5,526,999 A | 6/1996 | Meston | |
| 5,568,901 A | 10/1996 | Stiennon | |
| 5,628,476 A * | 5/1997 | Soranno et al. | 244/172.1 |
| 5,667,167 A | 9/1997 | Kistler | |
| 5,927,653 A | 7/1999 | Mueller et al. | |
| 6,557,803 B2 | 5/2003 | Carpenter et al. | |
| 6,568,639 B2 | 5/2003 | Carpenter et al. | |
| 6,612,522 B1 | 9/2003 | Aldrin et al. | |
| 6,629,673 B2 | 10/2003 | Casillas et al. | |
| 6,666,409 B2 | 12/2003 | Carpenter et al. | |
| 6,685,141 B2 | 2/2004 | Penn | |
| 7,080,809 B2 | 7/2006 | Hall | |
| 7,484,692 B1 | 2/2009 | McKinney et al. | |
| 2003/0052232 A1 | 3/2003 | Hall | |

* cited by examiner

*Primary Examiner* — Rob Swiatek

(74) *Attorney, Agent, or Firm* — Carlson, Gaskey & Olds P.C.

(57) ABSTRACT

A spacecraft includes a first engine configured to provide primary launch abort thrust and a second engine disposed radially from a center of gravity, the second engine configured to provide a secondary launch abort thrust, a primary orbital maneuvering thrust, and a primary control thrust.

23 Claims, 4 Drawing Sheets

LAUNCH ABORT AND ORBITAL MANEUVER SYSTEM

BACKGROUND

The present disclosure relates to an orbital launch vehicle, and more particularly to a propulsion system therefore.

Human space exploration is a source of U.S. national pride and excellence. One program that NASA is pursuing is Commercial Crew Development (CCDev).

Space vehicles, while of exceedingly high reliability, nevertheless have an increased overall safety margin if provided with a separation system for the crew capsule. The separation system is typically a solid rocket system that pulls the crew capsule away from the launch vehicle. To reduce the performance penalty to the space vehicle, the separation system is typically jettisoned as soon as potential escape modes have subsided and prior to orbital injection.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
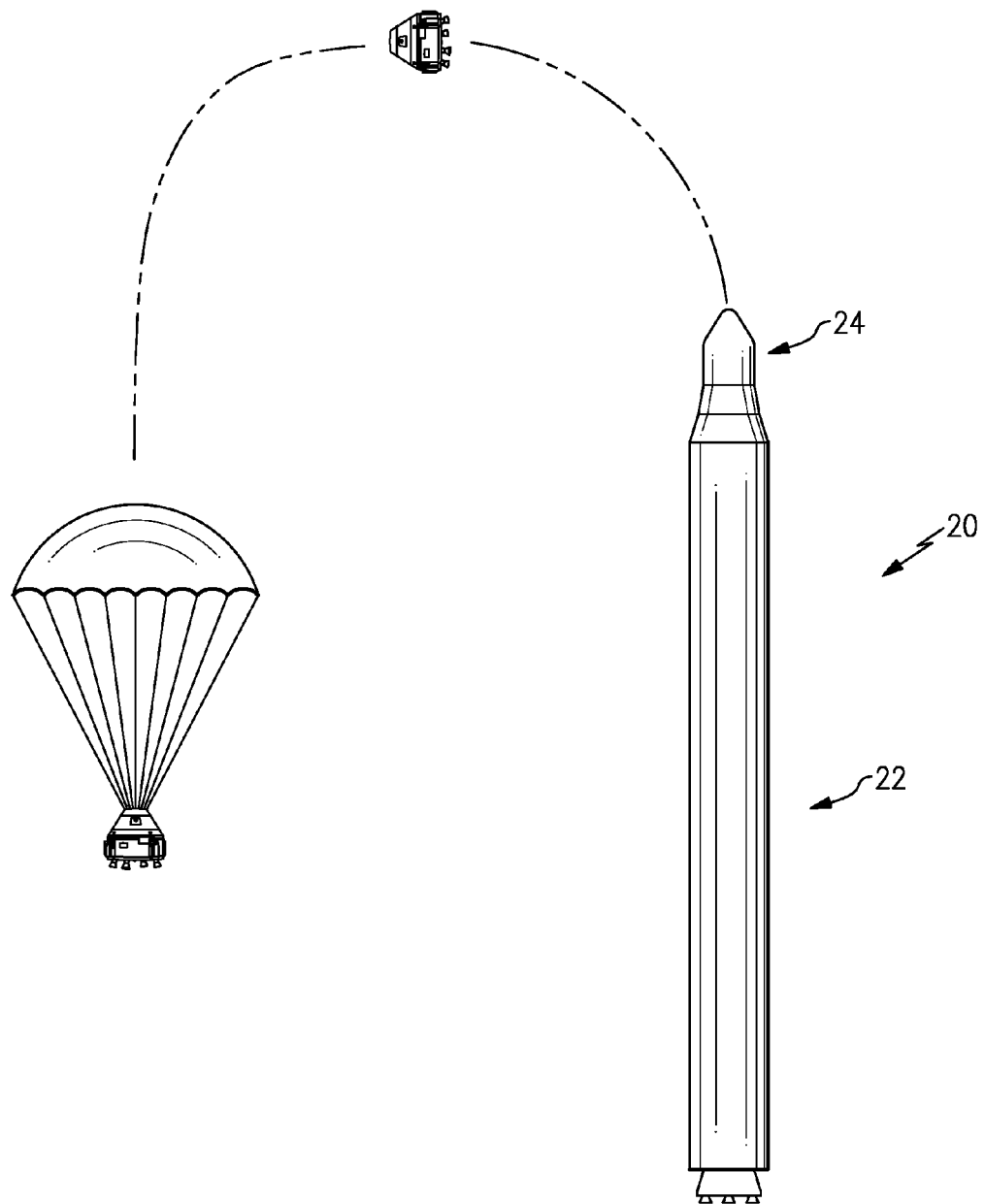
FIG. 1 is a general schematic review of a space vehicle which requires a launch abort mode operation.
Figure 2:
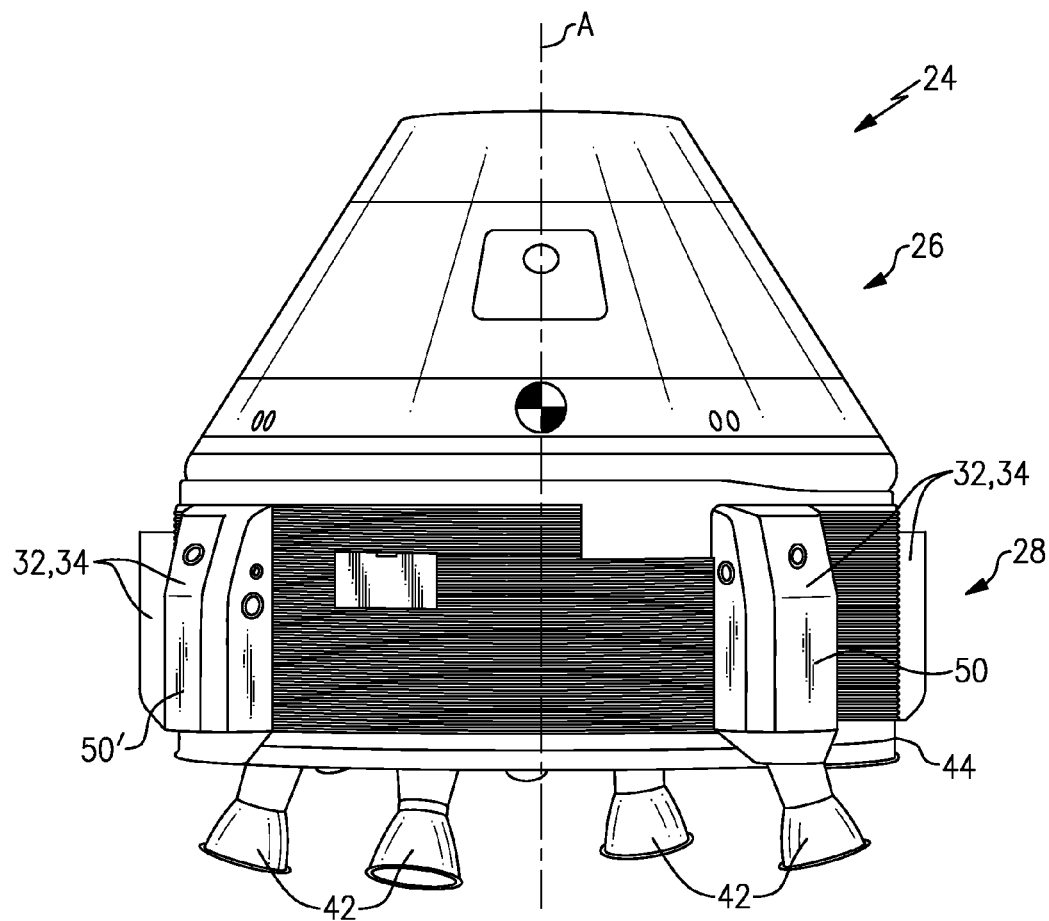
FIG. 2 is a perspective view of a spacecraft.

FIG. 1 schematically illustrates a space vehicle 20. The space vehicle 20 includes at least one launch vehicle 22 and a spacecraft 24 designed to be placed into Earth orbit. The spacecraft 24 is a vehicle which may include a crew capsule 26 and a service module propulsion system 28 (FIG. 2). The spacecraft 24 facilitates activities in a space environment, such as service to a space station, maintenance of existing satellites, placement of equipment in orbit and other activities. It should be understood that the spacecraft 24 need not necessarily require a crew for such activities.

Should a launch abort mode separation be required, the service module propulsion system 28 develops sufficient thrust so that the spacecraft 24 accelerates away from the launch vehicle 22 which may have a considerable acceleration. The spacecraft 24 may require accelerations as high as 10 or more times the force of gravity at the instant of launch abort mode operation separation but may thereafter be allowed to rapidly decrease. Once the spacecraft 24 achieves desired separation a parachute or other system is deployed, and the spacecraft 24 safely lands.

Figure 3:
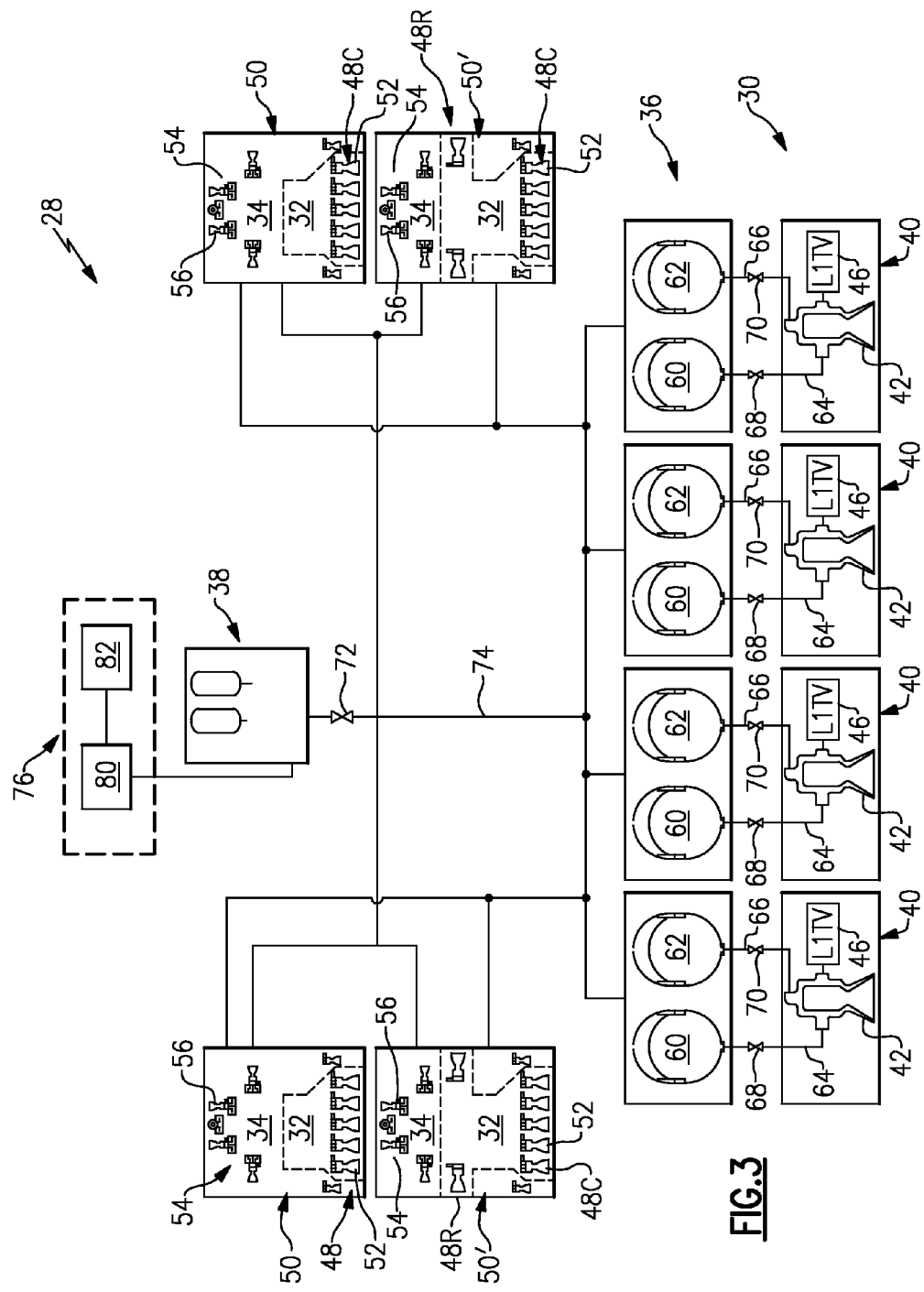
FIG. 3 is a block diagram of the service module propulsion system.

With reference to FIG. 3, the service module propulsion system 28 generally includes a launch abort engine system 30, an Orbit Maneuvering and Attitude Control (OMAC) system 32, a reaction control system (RCS) 34, a propellant system 36 and a pressurant system 38. The propellant system 36 and the pressurant system 38 are shared with the launch abort engine system 30, the Orbit Maneuvering and Attitude Control (OMAC) system 32 and the Reaction Control System (RCS) 34.

The launch abort engine system 30 includes a multiple of launch abort engines 40 each with a launch abort nozzle 42 arranged in a pusher configuration. The launch abort nozzles 42 are displaced from a central spacecraft axis A but within an outer mold line 44 of the service module propulsion system 28 (FIG. 2). Each of the launch abort nozzles 42 define, in one disclosed non-limiting embodiment, an outward cant angle relative to the central spacecraft axis A upon which the spacecraft center of gravity is located.

Each of the multiple of launch abort engines 40 generate, in one disclosed non-limiting embodiment, approximately 53,000 pounds of thrust each through each of the multiple of launch abort nozzles 42 which define a nozzle area ratio of less than 10:1 and in one disclosed non-limiting embodiment, a nozzle area ratio of 6:1. Nozzle Area Ratio is the ratio of an exit area to a throat area and is typically synonymous with expansion ratio.

The launch abort engine system 30 may alternatively or additionally include a Liquid Injection Thrust Vector Control (LITVC) 46 (illustrated schematically). The LITVC 46 essentially injects propellant directly into the launch abort nozzles 42 to generate a thrust vector which selectively vectors the thrust about an approximately 1 degree offset from the thrust axis T of each of the multiple of launch abort engines 40 to provide directional control for a launch abort mode operation.

The OMAC system 32 includes a multiple of OMAC engines 48 in each of a multiple of housings 50. Each OMAC engine 48 includes an OMAC nozzle 52 which defines a nozzle area ratio greater than or equal to 10:1. Each OMAC engine 48 in the disclosed non-limiting embodiment are multi-mode sea level and altitude pulse engines which generate, in one disclosed non-limiting embodiment, approximately 1,500 pounds of thrust at 50 hz.

The OMAC engines 48 may be arranged singularly or in an OMAC cluster 48C in each housing 50. Each housing 50 is located radially outward of the multiple of launch abort engines 40 outside of the outer mold line 44 (FIG. 2). One OMAC cluster 48C includes, in the disclosed non-limiting embodiment, five OMAC engines 48 within each of four housings 50 such that the five OMAC engines 48 of the OMAC cluster 48C are directed generally parallel to the central spacecraft axis A. It should be understood that various multiples and arrangements of the OMAC engines 48 may alternatively or additionally provided in the OMAC cluster 48C.

In another disclosed non-limiting embodiment, two opposed OMAC roll engines 48R are also located in a housing 50' transverse to the central spacecraft axis A to provide additional roll authority and stability. It should be understood that the spacecraft may include four or other multiples of housings 50, 50' or combinations thereof.

The Reaction Control System (RCS) 34 includes a multiple of RCS engines 54 which are also located in each of the multiple of housings 50, 50'. The RCS 34 provides attitude control through relatively small amounts of thrust in any desired direction or combination of directions to, for example, provide station keeping, close maneuvering during docking procedures, control of orientation and other fine maneuvers.

Each RCS engine 54 includes an RCS nozzle 56. Each of the multiple of RCS engines 54 generates, in one disclosed non-limiting embodiment, less than 100 pounds of thrust through the RCS nozzle 56 which defines a nozzle area ratio greater than or equal to 40:1.

The RCS engines 54 may also be arranged singularly or in a RMC cluster. In the disclosed non-limiting embodiment, the RCS 34 locates a pair of opposed RCS engines 54 transverse to the RCS 34 and includes at least one RCS engine 54 to provide roll about the X-axis, pitch about the Y-axis and yaw about the Z-axis. Location of the housings 50, 50' on the outer periphery of the service module propulsion system 28 further facilitates responsive attitude control in roll, pitch and yaw due to the displacement from the central spacecraft axis A. It should be understood that the RCS engines 54 may be arranged in various orientations and combinations within each housing 50, 50'.

The propellant system 36 includes a multiple of fuel tanks 60 and a multiple of oxidizer tanks 62 which contain a respective fuel such as Monomethylhydrazine (MMH) and an oxidizer such as mixed oxides of nitrogen (MON-3) to provide a Hypergolic propellant which ignite spontaneously on contact with each other and require no ignition source. The start and restart capability of hypergols facilitate operations of the service module propulsion system 28.

In the disclosed non-limiting embodiment, each launch abort engine 40 is mounted as an assembly with a respective pair of fuel and oxidizer tanks 60, 62, however, it should be understood that the propellant system 36 cross-feeds and supplies the launch abort engine system 30, the OMAC system 32 and the RCS 34 of the service module propulsion system 28.

Each launch abort engine 40 is connected to the multiple of fuel tanks 60 and the multiple of oxidizer tanks 62 through a respective fuel line 64 and oxidizer line 66. The flow of fuel and oxidizer into each launch abort engine 40 is controlled by a valve 68, 70 located in the respective fuel line 64 and oxidizer line 66. Launch abort engine valves 68, 70 may be lance fractured burst disks or electromechanical valves through the use of one or both of the propellants as a working fluid.

The pressurant system 38 is connected through a pressurant control valve 72 such as a redundant regulator valve system to supply a pressurant gas such as gaseous helium (GHe) by way of pressurant gas lines 74 which communicate with each of the multiple of fuel tanks 60 and each of the multiple of oxidizer tanks 62 to supply pressurant thereto.

The pressurant control valve 72 is controlled by a control module 76 to selectively define at least a first setting which provides a nominal pressure and a second setting which provides a pressure higher than the nominal pressure. The nominal pressure provides the desired pressure to the multiple of fuel tanks 60 and the multiple of oxidizer tanks 62 to supply the OMAC system 32 and the RCS 34 for orbital maneuvering mode operations. The second setting assures that the Launch abort engine valves 68, 70 open to provide the desired pressure to the multiple of fuel tanks 60 and the multiple of oxidizer tanks 62 to supply the OMAC system 32, the RCS 34 and the launch abort engine system 30 for launch abort mode operations.

The control module 76 generally includes a control 80 and a sensor system 82 in communication with the control 80. The control 80 typically includes a processor, a memory, and an interface. The processor may be any type of microprocessor having desired performance characteristics. The memory may include any type of computer readable medium which stores the data and control algorithms described herein. The interface may include any system that facilitates communication with the sensor system 82 as well as other systems.

The sensor system 82 operates to detect deviation from a nominal liftoff or some other failure or out-of-norm parameter, such as excessive yaw, pitch or roll rates. Upon such detection, the control 80 operates the pressurant control valve 72 as well as any other valves necessary to initiate launch abort mode operations. It should be understood that other launch abort mode operation initiation methodology may alternatively or additionally be provided.

In launch abort mode operation, there is an inherent disturbance torque that is generated due to the resultant thrust offset relative to the vehicle center of gravity (CG). This disturbance torque is reduced by the LITVC 46 of the launch abort engine system 30, but this in itself is typically not enough to achieve stable flight. In order to counter the remaining disturbance torque and fly stable, the OMAC system 32 operates in a pulse mode to generate a restoring torque to achieve the control authority required for stable flight. That is, the OMAC system 32 controls the spacecraft 24 during the launch abort mode as well as supplements and operates in conjunction with the launch abort engine system 30.

The OMAC engines 48, generate additional launch abort thrust in conjunction with the launch abort engine system 30 during launch abort mode operations, provide pulse mode operation for stability during the launch abort mode, generate abort thrust at a high altitude when the power of the launch abort engine system 30 is not required, and also provide orbit maneuver control such as, for example, orbital insertion; orbital circulation burns; transfer between orbits; de-orbiting; and other maneuvers within, into and out of orbit. That is, the OMAC engines 48 provide secondary launch abort thrust, primary orbital maneuvering thrust and a primary control thrust.

The OMAC cluster 48C in each of the four housings 50, 50' provide between 5%-10% of launch abort thrust in the launch abort mode and, in one disclosed non-limiting embodiment, approximately 6%-7% of the launch abort thrust in conjunction with the launch abort engine system 30 which provides the remainder for a relatively low altitude launch abort which is defined herein as from ground level to approximately 80,000 ft. The OMAC engines 48 may also provide all or a greater percentage of the launch abort thrust should a launch abort be required above approximately 80,000 ft.

Figure 4:
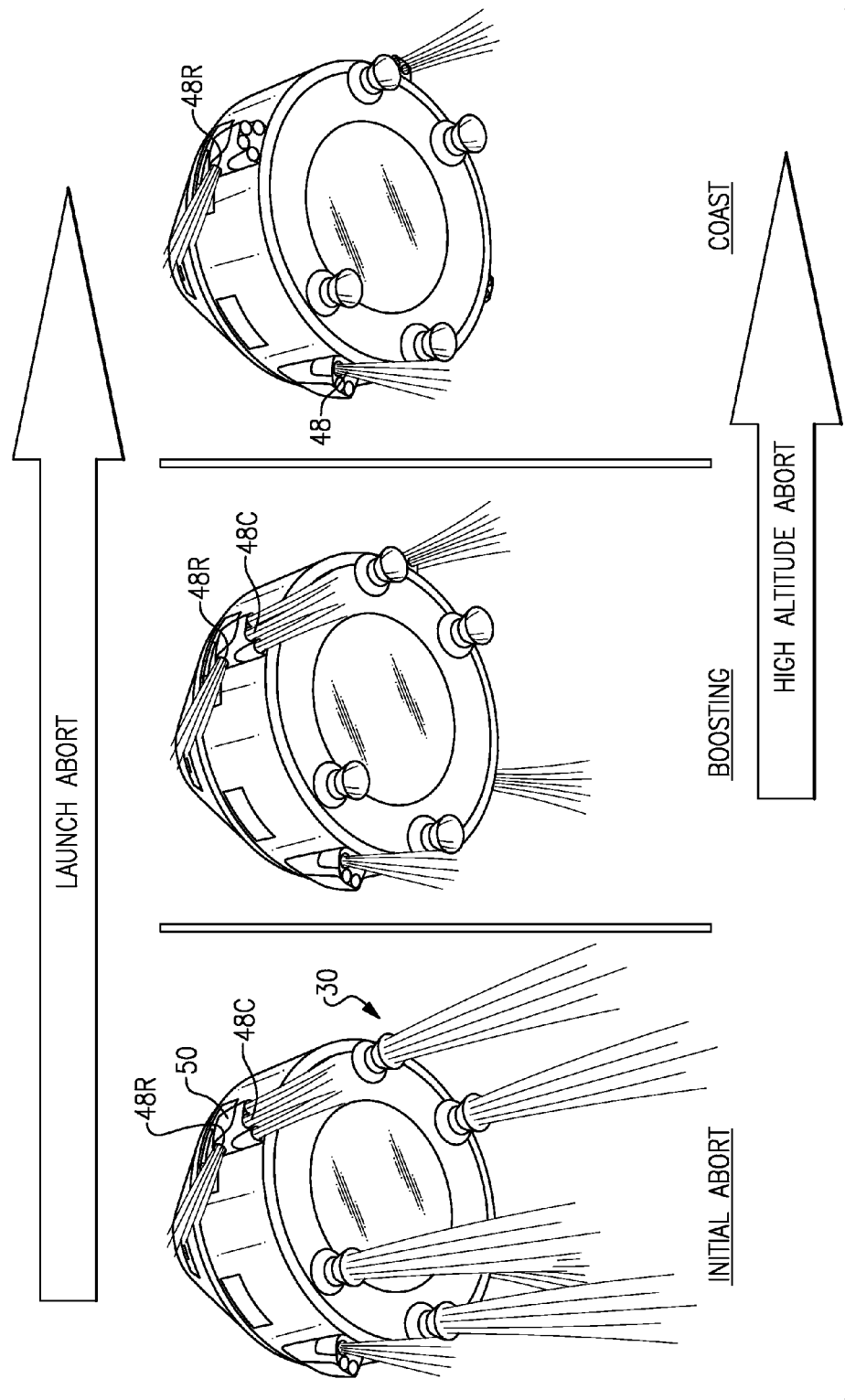
FIG. 4 is an event timeline of launch abort mode operation.

With reference to FIG. 4, for the initial launch abort mode between, for example, 0-3.4 seconds—initial abort—the OMAC cluster 48C in each housing 50, 50' and the launch abort engine system 30 fire in conjunction for launch abort mode operations. That is, the launch abort engine system 30 provides primary launch abort thrust in conjunction with the OMAC engines 48 which provide secondary launch abort thrust.

From, for example, 3.4-5.4 seconds from initial abort—boosting—only the OMAC cluster 48C in each housing 50 fires. That is, either the launch abort engine system 30 has been shut down after initial abort, or the launch abort engine system 30 did not fire for a relatively high altitude launch abort in which only the OMAC cluster 48C in each housing 50 fires. Notably, the OMAC roll engines 48R in each housing 50 may pulse to provide roll control and stability throughout the entire launch abort operation.

After approximately 5.4 seconds—coast—the OMAC system 32 and the RCS 34 in each housing 50, 50' operate in a pulse mode to provide controllability of the spacecraft 24 prior to parachute system deployment (FIG. 1).

Use of the launch abort engine system 30 for launch abort mode operations generates immediate high thrust and has control maneuverability with the OMAC system 32 yet reduces cost as the OMAC system 32 is used in both launch abort mode and orbital maneuvering mode operations which reduces the total number of engine systems. Furthermore, the shared propellant system 36 and pressurant system 38 minimizes unused components which are carried into orbit on every mission.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A spacecraft having a center of gravity, the spacecraft comprising:
   a first engine displaced from a central axis of a spacecraft a first distance and configured to provide primary launch abort thrust; and
   a second engine disposed radially from a center of gravity, said second engine displaced from said central axis of said spacecraft a second distance different than said first distance, said second engine configured to provide a secondary launch abort thrust, a primary orbital maneuvering thrust, and a primary control thrust.

2. The spacecraft as recited in claim 1, wherein said primary launch abort thrust is approximately 95% of launch abort thrust.

3. The spacecraft as recited in claim 2, wherein said secondary launch abort thrust is approximately 5% of launch abort thrust.

4. The spacecraft as recited in claim 3, wherein said second engine is controllable at approximately 50 Hz.

5. The spacecraft as recited in claim 1, wherein said first engine defines a nozzle area ratio of less than 10:1.

6. The spacecraft as recited in claim 1, wherein said second engine defines a nozzle area ratio of greater than or equal to 10:1.

7. The spacecraft as recited in claim 1, further comprising a multiple of third engines, each of said multiple of third engines define a nozzle area ratio greater than a nozzle area ratio of said second engine, at least one of said multiple of third engines directed transverse to the central spacecraft axis.

8. A spacecraft comprising:
   a multiple of first engines displaced from a central spacecraft axis, said multiple of first engines configured to provide primary launch abort thrust operable only in a launch abort mode; and
   a multiple of second engines operable in conjunction with said multiple of first engines in said launch abort mode, said multiple of second engines configured to provide a secondary launch abort thrust in said launch abort mode and a primary orbital maneuvering thrust, said primary launch abort thrust and said secondary launch abort thrust provided to move said spacecraft in a common direction.

9. The spacecraft as recited in claim 8, wherein each of said multiple of first engines define a nozzle area ratio of less than 10:1.

10. The spacecraft as recited in claim 9, wherein each of said multiple of second engines define a nozzle area ratio of greater than or equal to 10:1.

11. The spacecraft as recited in claim 8, wherein each of said multiple of first engines define an outward cant angle relative to a central spacecraft axis.

12. The spacecraft as recited in claim 8, wherein each of said multiple of first engines include a liquid injection thrust vector control.

13. The spacecraft as recited in claim 8, wherein each of said multiple of second engines are mounted in a housing, said housing radially outboard of said multiple of first engines.

14. The spacecraft as recited in claim 13, wherein said housing is mounted to an outer periphery of said spacecraft.

15. The spacecraft as recited in claim 8, wherein the said multiple of first engines and said multiple of second engines are configured to operate together in said launch abort mode.

16. A spacecraft comprising:
   a multiple of first engines displaced from a central spacecraft axis, said multiple of first engines configured to provide primary launch abort thrust operable only in a launch abort mode;
   a multiple of second engines operable in conjunction with said multiple of first engines in said launch abort mode, said multiple of second engines configured to provide a secondary launch abort thrust in said launch abort mode and a primary orbital maneuvering thrust;
   a housing, each of said multiple of second engines mounted in said housing, said housing radially outboard of said multiple of first engines and mounted to an outer periphery of said spacecraft; and
   a multiple of third engines mounted in said housing, each of said multiple of third engines define a nozzle area ratio greater than a nozzle area ratio of each of said multiple of second engines, at least one of said multiple of third engines directed transverse to the central spacecraft axis.

17. A method of spacecraft propulsion comprising:
   firing a multiple of first engines arranged in a pusher configuration and displaced from a central spacecraft axis in a launch abort mode, the firing of the multiple of first engines to provide a primary launch in a first direction; and
   firing a multiple of second engines in conjunction with multiple of first engines in the launch abort mode, the firing of the multiple of second engines to selectively provide a secondary launch abort thrust in a second direction when in the launch abort mode, wherein the first direction is generally the same as the second direction.

18. The method as recited in claim 17, further comprising:
   controlling only the multiple of second engines to provide a primary orbital maneuvering thrust at approximately 50 HZ.

19. The method as recited in claim 17, further comprising:
   controlling the multiple of second engines to provide a primary control thrust at approximately 50 HZ.

20. The method as recited in claim 17, further comprising:
   controlling only the multiple of second engines to provide a primary orbital maneuvering thrust and a primary control thrust.

21. The method as recited in claim 17, further comprising:
   controlling the multiple of second engines to provide approximately 5% of a total thrust in the launch abort mode.

22. The method as recited in claim 17, wherein the firing of the multiple of first engines and the firing of the multiple of second engines occurs at the same time to propel the spacecraft.

23. The method as recited in claim 17, wherein the multiple of first engines and the multiple of second engines are propelling a common spacecraft during the firing.

* * * * *